(12) United States Patent
Stadler et al.

(10) Patent No.: US 10,384,403 B2
(45) Date of Patent: Aug. 20, 2019

(54) METHOD FOR PRODUCING AN ELECTRICAL LINE, TOOL MOULD FOR SUCH A METHOD, AND LINE

(71) Applicant: LEONI KABEL GMBH, Nuremberg (DE)

(72) Inventors: Wolfgang Stadler, Hilpoltstein (DE); Joerg Wenzel, Roth (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/626,530

(22) Filed: Jun. 19, 2017

(65) Prior Publication Data
US 2017/0282464 A1    Oct. 5, 2017

Related U.S. Application Data

(63) Continuation of application No. PCT/EP2015/080040, filed on Dec. 16, 2015.

(30) Foreign Application Priority Data

Dec. 17, 2014    (DE) .......................... 10 2014 226 335

(51) Int. Cl.
*H01B 7/02*    (2006.01)
*H04R 1/10*    (2006.01)
(Continued)

(52) U.S. Cl.
CPC .............. *B29C 69/02* (2013.01); *B29C 33/36* (2013.01); *B29C 45/0003* (2013.01);
(Continued)

(58) Field of Classification Search
CPC ......... B29C 69/02; B29C 33/36; B29C 45/56; B29C 45/37; B29C 47/0033; B29C 45/14639; B29C 45/14549; B29C 47/0045; B29C 47/025; B29C 45/14016; B29C 45/0441; B29C 45/0408; B29C 45/0003; B29C 47/126; B29C 33/34;
(Continued)

(56) References Cited

U.S. PATENT DOCUMENTS 2,760,228 A * 8/1956 Verges ............... B29C 49/0021
                                                    156/433
3,323,167 A * 6/1967 Verges ............... B29C 49/0021
                                                    156/137
(Continued)

FOREIGN PATENT DOCUMENTS

CN          1313809 A      9/2001
DE          823606 C      12/1951
(Continued)

*Primary Examiner* — Jeffrey M Wollschlager
(74) *Attorney, Agent, or Firm* — Laurence A. Greenberg; Werner H. Stemer; Ralph E. Locher

(57) ABSTRACT

A process produces an electrical line which extends in the longitudinal direction and the line has a line core and an outer shell. In a continuous shaping process, individual shell portions of the outer shell are formed successively by surrounding the line core with a curable plastic substance. In at least one portion, the outer shell is produced having a cross-sectional geometry which can be varied in the longitudinal direction of the line.

6 Claims, 6 Drawing Sheets

(51) Int. Cl.

| | | |
|---|---|---|
| *B29C 33/34* | (2006.01) | |
| *B29C 33/36* | (2006.01) | |
| *B29C 45/00* | (2006.01) | |
| *B29C 45/04* | (2006.01) | |
| *B29C 45/14* | (2006.01) | |
| *B29C 45/26* | (2006.01) | |
| *B29C 45/37* | (2006.01) | |
| *B29C 45/56* | (2006.01) | |
| *B29C 48/00* | (2019.01) | |
| *B29C 48/12* | (2019.01) | |
| *B29C 48/13* | (2019.01) | |
| *B29C 48/30* | (2019.01) | |
| *B29C 49/00* | (2006.01) | |
| *B29C 69/02* | (2006.01) | |
| *B29L 31/34* | (2006.01) | |
| *H01B 13/14* | (2006.01) | |
| *H01B 13/24* | (2006.01) | |
| *B29C 48/154* | (2019.01) | |
| *B29C 48/156* | (2019.01) | |

(52) U.S. Cl.
CPC ...... *B29C 45/0408* (2013.01); *B29C 45/0441* (2013.01); *B29C 45/14016* (2013.01); *B29C 45/14549* (2013.01); *B29C 45/14639* (2013.01); *B29C 45/37* (2013.01); *B29C 45/56* (2013.01); *B29C 48/0013* (2019.02); *B29C 48/13* (2019.02); *B29C 48/154* (2019.02); *B29C 48/30* (2019.02); *B29C 48/303* (2019.02); *H01B 7/0275* (2013.01); *H01B 13/14* (2013.01); *H01B 13/24* (2013.01); *H04R 1/1033* (2013.01); *B29C 33/34* (2013.01); *B29C 45/2673* (2013.01); *B29C 48/002* (2019.02); *B29C 48/0017* (2019.02); *B29C 48/12* (2019.02); *B29C 48/156* (2019.02); *B29C 49/0015* (2013.01); *B29C 49/0021* (2013.01); *B29C 49/0026* (2013.01); *B29L 2031/3462* (2013.01); *H04R 1/1058* (2013.01)

(58) Field of Classification Search
CPC . B29C 45/2673; B29C 47/003; B29C 47/004; B29C 47/0054; B29C 47/0061; B29C 47/027; B29C 49/0015; B29C 49/0021; B29C 49/0026; H01B 13/0009; H01B 13/0013; H01B 13/14; H01B 7/0275; H01B 13/24; H04R 1/1033; H04R 1/1058; B29L 2031/3462
USPC .......................................................... 264/508
See application file for complete search history.

(56) References Cited

U.S. PATENT DOCUMENTS

| | | | | |
|---|---|---|---|---|
| 3,881,851 | A | * | 5/1975 | Allanic ............... B29C 49/0021 425/113 |
| 3,892,912 | A | * | 7/1975 | Hauck .................. B29C 47/128 174/113 R |
| 3,928,519 | A | | 12/1975 | Kashiyama et al. |
| 5,324,557 | A | * | 6/1994 | Lupke ................. B29C 47/0023 138/121 |
| 5,832,960 | A | * | 11/1998 | Amatsutsu ........... H02G 3/0468 138/110 |
| 6,051,789 | A | * | 4/2000 | Kato ................... B29C 47/0023 138/121 |
| 6,053,214 | A | * | 4/2000 | Sjoberg .................... B32B 1/08 138/134 |
| 6,676,881 | B1 | | 1/2004 | Byun |
| 9,387,818 | B2 | * | 7/2016 | Sugimoto ............ H02G 3/0468 |
| 9,692,216 | B2 | * | 6/2017 | Sugimoto ............ H02G 3/0468 |
| 2007/0001347 | A1 | | 1/2007 | Pielsticker |
| 2008/0026094 | A1 | | 1/2008 | Dettinger et al. |
| 2008/0251963 | A1 | | 10/2008 | Steiner et al. |
| 2010/0116523 | A1 | | 5/2010 | Nachbauer |
| 2011/0180302 | A1 | | 7/2011 | Aase et al. |
| 2011/0180321 | A1 | | 7/2011 | Aase et al. |
| 2011/0297415 | A1 | * | 12/2011 | Katou ................. B60R 16/0215 174/68.3 |
| 2015/0310961 | A1 | * | 10/2015 | Mizuno .................. H01B 13/06 174/110 SR |
| 2016/0276063 | A1 | * | 9/2016 | Mizuno .................... H01B 7/24 |

FOREIGN PATENT DOCUMENTS

| | | |
|---|---|---|
| DE | 922241 C | 1/1955 |
| DE | 2338186 A1 | 2/1974 |
| DE | 102005031222 A1 | 1/2007 |
| EP | 0865130 A1 | 9/1998 |
| EP | 1882574 A1 | 1/2008 |
| EP | 2187491 A1 | 5/2010 |
| JP | S49105861 A | 10/1974 |
| WO | 2006045720 A1 | 5/2006 |
| WO | 2011154507 A1 | 12/2011 |

* cited by examiner

METHOD FOR PRODUCING AN ELECTRICAL LINE, TOOL MOULD FOR SUCH A METHOD, AND LINE

CROSS-REFERENCE TO RELATED APPLICATION

This is a continuation application, under 35 U.S.C. § 120, of copending international application No. PCT/EP2015/080040, filed Dec. 16, 2015, which designated the United States; this application also claims the priority, under 35 U.S.C. § 119, of German patent application No. 10 2014 226 335.2, filed Dec. 17, 2014; the prior applications are herewith incorporated by reference in their entireties.

BACKGROUND OF THE INVENTION

Field of the Invention

The invention relates to a process for producing a line, in particular an electrical line, which extends in a line longitudinal direction and which has a line core and an outer shell surrounding the line core. The invention also relates to a line of this type and to a tool mold which is used in the process.

The outer shell of such electrical lines is conventionally formed, by a molding process, from a solidifiable compound which is plastic during the production process. Here, a liquid or viscous plastics compound is initially applied, which subsequently hardens. This occurs for example naturally by solidification, or actively through the supply of (activation) energy, for example by irradiation etc., such that active hardening is thus achieved. Below, unless stated otherwise in the description, the expression "hardening" encompasses both passive solidification and active hardening.

It is common for further additional functional units to be integrated in the outer shell. For example, sealing elements such as for example bushes are integrally molded directly on the outer shell, or anti-kink elements or other widened portions are also attached for example in the end region at which plugs are arranged. To form these additional functional units, it is conventionally the case here—taking an already prefabricated unit, possibly with an already formed partial outer shell, as a starting point—that an additional process step is required in order to attach the additional functional units to the outer shell. This is normally realized by an injection molding process in which the prefabricated line strand is laid into a tool mold and the hardenable compound is subsequently introduced into the tool mold in order to form the functional element.

The entire outer shell is therefore conventionally produced in a two-stage process. For this purpose, in the first stage, the outer shell is applied for example by a continuous extrusion process in order thereby to provide a line blank with line core and outer shell as yard ware, as it were. The line blank is subsequently shortened to the desired length, and plug elements are for example attached to the ends, and finally, the functional units of the outer shell such as anti-kink elements, plug encapsulations, sealing elements etc. are molded on.

Altogether, the two-stage process is relatively cumbersome. Also, in the case of lines which are visible during use and which are used for example by the end consumer, this often leads to a design with low design appeal.

SUMMARY OF THE INVENTION

Taking this as a starting point, it is the object of the invention to permit simplified production of such electrical lines.

The object is achieved according to the invention by a process for producing an electrical line which extends in a line longitudinal direction and which has a line core and an outer shell surrounding the line core. Here, the outer shell is formed overall in a continuous molding process by a tool mold, wherein, in the molding process, individual shell sections of the outer shell are formed in successive fashion by virtue of the line core being surrounded with a solidifiable or hardenable plastics compound. Here, in at least one subsection, the outer shell is produced with a cross-sectional geometry which varies in the line longitudinal direction.

The line core is preferably fed in successive or continuous fashion to the tool mold and is provided with the outer shell in sections. In other words: the line core is guided in successive or continuous fashion through the tool mold, and the outer shell is applied to the line core. For this purpose, the tool mold expediently has a feed opening via which the line core is guided into the tool mold. In one refinement, the tool mold expediently also has an exit opening via which the line core provided with the outer shell is conveyed out of the tool mold. The tool mold is in particular a tool mold which is closed aside from the feed opening and possibly the exit opening, and which thus fully surrounds the line core in the circumferential direction. The tool mold is alternatively an open tool mold similar to a die, which thus does not enclose the line core toward one radial side.

With the molding process, it is therefore the case overall that varying cross-sectional geometries of the outer shell are produced in a continuous process. It is achieved in this way that, despite the continuous process, the above-described functional units can be formed directly on the outer shell during the molding thereof. There is thus no need for an additional injection-molding step for the purposes of attaching the functional units. In the region of the functional units, in which the outer shell has a variable cross-sectional geometry, the outer shell is thus of altogether more homogeneous and uniform design, because no material separation points are formed.

The electrical lines are in this case preferably non-rigid, flexible lines, which thus do not have inherent dimensional stability. Such electrical lines are used in particular as connection lines for electrical appliances.

The line core is suitably held under tension at least within the tool mold during the process, whereby in particular, an undesired offset of the line core relative to the outer shell is prevented. Such an offset typically arises in the case of conventional injection-molding processes owing to the lateral forces exerted by the plastics material injected laterally into the tool mold. The additional tensile load consequently generally counteracts an introduction of force in a particularly effective and simple manner. Thus, in particular in rotationally symmetrical subsections of the line, the line core is arranged centrally, that is to say along a central axis of the line. In the case of a line with a circular subsection, it is for example the case that the line core runs through the entire subsection at the central point of the in this case circular cross-sectional geometry. It is generally possible by this process for the line core to be arranged along an intended longitudinal axis, that is to say for a slippage of the line core relative to the desired position, for reasons relating to process technology, to be prevented. Along a rotationally symmetrical subsection, the longitudinal axis corresponds in particular to the abovementioned central axis. Rotationally symmetrical cross-sectional geometries are in particular a circle, a square or some other regular polygon, or else for example a rectangle which exhibits twofold rotational symmetry with respect to the central axis.

In a preferred refinement, the tool mold is assigned at least one guide element by which the line core is guided and held under tension. Here, "guided" is to be understood in particular to be either fed or discharged, depending on whether the guide element is positioned upstream or downstream of the tool mold. This refinement is particularly simple and at the same time permits the provision of a suitable tensile force at least in that subsection of the line core which is passing through the tool mold at a given point in time. In an expedient refinement, the tool mold is positioned upstream of a first guide element and downstream of a second guide element in order to hold the line core under tension. The guide element is preferably in the form of a conveying element and in particular in the form of a so-called crawler, wherein, in the case of at least two guide elements, the first guide element acts as a braking crawler and impedes a feed of the line core into the tool mold as required, and wherein the second guide element is a thrust crawler which, in order to generate a tensile load, conveys the line core, surrounded by the outer shell, away from the tool mold. Through suitable selection of the rolling or conveying characteristics of the two guide elements, a suitable tensile force is then generated, by which the line core is held in a stretched state. The tensile load preferably acts even during the introduction of the plastics compound, such that a possible temperature-induced expansion of the line core is directly compensated, that is to say the line core is held taut. In particular, it is provided that, in a periodically alternating manner, firstly the line core is fixed during the introduction of the compound, and subsequently a conveying action is imparted, thus giving rise to crawler-like conveyance of the line core, similarly to stop-and-go operation.

In a suitable variant, the guide elements are in the form of holders, in particular holding jaws. This variant is suitable in particular in the case of a quasi-continuous process in which the line core is, for the purposes of forming the outer shell on a respective subsection, moved together with the tool mold, that is to say is stationary relative to the tool mold. The tool mold and the line core positioned therein are in this case moved relative to an injection point via which the plastics material is fed to the tool mold along a gate slot. After completion of the feed of material, the holding jaws are then released, and the subsection is conveyed out of the tool mold, and a still-uncladded next subsection of the line core is fed in. The holding jaws are then activated again, and the formation of the next subsection of the line is performed.

In a preferred refinement, to form the outer shell, the plastics compound is introduced into the tool mold, wherein the tool mold has at least one molding module which has a molding cavity with a cross-sectional geometry which varies in a line longitudinal direction in order to form the subsection with correspondingly varying cross-sectional geometry. In this way, it is possible in particular to manufacture a line with virtually any desired outer contour. In particular, even undercuts are possible here. The cross-sectional geometry is not necessarily symmetrical, but may in principle assume all conceivable forms. In this way, it is possible for one or more subsections along the line to be equipped with different functional elements. These or at least the housings thereof, if it is also necessary for additional, for example electronic, components to be incorporated, are advantageously a part of the outer shell owing to their being formed jointly therewith, that is to say are manufactured in one piece with the outer shell. In this way, the finished line is provided with considerably improved esthetics, but also improved functionality, in particular with regard to sealing action and strength.

In an expedient variant of the process, the outer shell is produced by the tool mold in a modified extrusion process, also referred to as an injection extrusion process. In this, it is first the case that, in an extrusion step, the line core is guided continuously through the molding module and a subsection of the outer shell with uniform cross-sectional geometry is extruded onto the line core. In a subsequent end step, the line core remains within the molding module and the introduced plastics compound is hardened in the molding module. Thus, in the end step, the subsection is formed as an end section. A particular advantage of this variant is that, both in the extrusion step and in the end step, a uniform, radial and concentric pressure prevails in the tool mold. Thus, it is in particular also the case that the end step differs from a conventional injection molding process. This modified extrusion process can be implemented in terms of machine technology either on the basis of a conventional extruder or on the basis of a conventional injection-molding apparatus.

Here, the molding module performs in particular two functions: first, the molding module serves, in the extrusion step, as an extrusion nozzle or as a feed to an extrusion nozzle of this type, and second, the molding module serves as a casting mold in the end step. Here, in both steps, the feed of the plastics material is realized in the same way, specifically in particular substantially in the longitudinal direction and concentric with respect to a central axis. However, in the end step, the feed is interrupted, and hardening of the material rather than conveying is performed.

In principle, in a suitable refinement, it is conceivable for the line manufactured in the above manner to be fed to the process once again as a partial line, in such a way that a further partial line is attached to the already finished partial line using the above process. The already finished partial line in this case constitutes a semi finished part, then serves as a starting point, and is arranged downstream of the tool mold for the further integral molding of additional partial lines. It is preferable for a semi finished part to be placed into the tool mold and for the outer shell to be applied to the semi finished part at least in sections. That is to say, the semi finished part contains a line core to which an outer shell is applied by the process described here. Thus, rather than merely a line core, a line core is used on which components have already been integrally molded. This is expedient for example in the production of earphones. Here, the semifinished part comprises a Y-shaped bifurcation for separation into two separate partial strands, on the end of which there is arranged in each case one earphone, and also comprises a line core, extending from the bifurcation, of a connection line. The semifinished part is then, at the start of the process, placed into the tool mold such that, subsequently, the line core of the connection line is provided with an outer shell. Here, the connection line may advantageously be formed in any desired length.

For the above-described refinement of a semi finished part, it is not imperatively necessary for the cross-sectional geometry of the molding cavity to vary in the line longitudinal direction. Rather, the above-described molding process is also suitable in a variant in which the molding module has a molding cavity with a cross-sectional geometry which does not vary in the line longitudinal direction. In this way, it is particularly easily possible to manufacture relatively long lines with suitable sealing action and dimensional stability. Here, a relatively long line is to be understood to mean a line whose length is only poorly suited to an injection molding process, that is to say for example between 1 and 5 m. Such a process, that is to say in particular a process having the features of the main process claim without the feature of the varying cross-sectional geometry, is considered to be an independent invention. We reserve the right to file a divisional application relating to this.

The molding module is suitably divisible, and is separated after the hardening process, and the line core provided with the outer shell is removed from the molding module. Thus, particular easy removal of the finished line is possible. Here, the removal is in particular similar to the removal of a finished injection-molded part at the end of a conventional injection-molding process.

The molding module is expediently temperature-controlled and actively cooled at least in the end step, whereby the hardening in the end step can be performed particularly quickly. The temperature control also permits an optimization with regard to the extrusion step, in such a way that, in particular, the flow characteristics of the plastics material can be set. In a particularly suitable refinement, the molding module has a certain temperature profile in the line longitudinal direction, whereby particularly comprehensive control of the extrusion step is then made possible. To achieve as uniform a hardening process as possible, a suitable temperature profile is selected in the end step too, which temperature profile normally differs from the temperature profile in the extrusion step.

In an advantageous refinement, the molding module is formed as mouth piece, or has at least one such mouth piece. Upstream of the mouth piece there is connected an extrusion mandrel, through which in turn the line core is guided. Here, the extrusion mandrel is received in a material distributor so as to form an annular hollow chamber via which the plastics compound is fed. This refinement is particularly suitable for the combination of the extrusion step with the injection-molding-like end step. Furthermore, owing to the annular hollow chamber, it is advantageously the case that no direct lateral injection is performed, such as is the case in a conventional injection-molding process, it rather being the case that plastics material is injected in uniform, concentric and annular fashion in a circumferential direction of the line core. Here, the plastics material is advantageously introduced into the molding module via the outer wall of the extrusion mandrel and substantially in the line longitudinal direction.

In particular for the hardening of the plastics compound as it exits the molding module, a cooling module is positioned downstream of the molding module, by which cooling module cooling of the compound applied to the line core is realized during the extrusion step. Thus, the cooling module furthermore advantageously acts as a calibration tool, such as is used for example in the case of a profile extrusion. To realize particularly efficient cooling, a number of coolant bores is formed into the cooling module, through which coolant bores a suitable coolant is pumped. Furthermore, the cooling module is advantageously divisible, similarly to the molding module, in order to simplify the removal of the finished line after the end step.

In an advantageous refinement, the cooling module is thermally insulated with respect to the molding module, and the two modules are temperature-controlled differently at least during the extrusion step. In this way, at the same time as optimum hardening in the cooling module, optimum temperature control of the plastics compound in the molding module is also made possible. In the extrusion step, it is thus the case in particular that heating of the molding module and cooling of the cooling module are performed, whereas in the end step, cooling of both modules is performed. Owing to the thermal insulation, mutual influencing of the modules which are temperature-controlled differently at least in the extrusion step is then advantageously reduced or prevented entirely.

Alternatively or in combination with one or more of the above-described refinements, as a molding process, use is made of a process similar to the process described for example in international patent disclosures WO 2006/045720 A1 (corresponding to U.S. Pat. No. 7,910,044) or WO 2009/043755 (corresponding to U.S. patent publication No. 2010/0221500). This continuous molding process is a combined extrusion and injection-molding process which combines the advantages of the two processes with one another, specifically first to generate the outer shell in the context of a continuous process and at the same time discontinuously form subsections with changed cross-sectional geometries.

The process, also referred to as ejection, is characterized in that a tool mold of modular construction is provided, which tool mold has individual molding modules in an in-line arrangement. The individual molding modules are in this case moved either linearly or in circulation, and are guided past an in particular fixed injection point, that is to say in particular past an injection nozzle, via which the hardenable compound, which is provided as a melt, is injected in each case into the individual molding module, before the next molding module is then moved to the gate point. Here, the molding module is in particular guided in continuous fashion along the gate point in a process direction, and the filling is performed along a gate slot which is formed into the molding module in the process direction. After the filling of the first molding module, the molding module is guided away from the gate point, that is to say the gate slot is no longer connected to the injection point, such that no further compound is fed and the introduced melt can solidify. The solidified subsection of the line can then be guided out of the molding module. For this purpose, the molding module is for example divided into two sub-halves which open for the purposes of guiding out the solidified subsection. Altogether, it is thus possible to produce an endless component which can be produced in a continuous process by the modular construction of the tool mold. As a result of the division of the tool mold into individual molding modules, it is possible for varying cross-sectional geometries to be provided as mold cavities within the molding modules. By contrast and in addition to those from the two cited applications WO 2006/045720 A1 and WO 2009/043755, the tool mold in the present case has the conductor core fed to it in successive fashion.

It is preferable for multiple molding modules to be used, of which at least one is configured so as to form a straight subsection with an outer contour running parallel to the line longitudinal direction, that is to say with an unchanged cross-sectional geometry. Through the use of multiple molding modules, it is possible in particular for multiple mutually different subsections to be manufactured.

In a preferred refinement, in the context of a continuous molding process, the cross-sectional geometry in the at least one subsection is widened in continuous fashion. Therefore, in the one subsection, the outer shell preferably has a conical widening, in particular in the region of a functional element, such as for example a plug element, which is connected to the end of the cable. In particular in the above-described process with extrusion step and end step, it is possible for a reinforced end section of the line to be produced by a continuously widened subsection.

Alternatively or in addition to this, one or a combination of the following elements is or are formed in the at least one subsection: radially outwardly projecting ribs, an anti-kink means, a sealing bush. Here, elements formed as ribs run either as circular rings, in each case spaced apart from one another, around the rest of the outer shell, or are arranged so as to run in helical fashion, or with some other geometry. By the ribs, a surface which is particularly easy to grip is realized in a simple manner, which surface in particular makes the handling of the line particularly comfortable for a user. Here, the projecting ribs form in particular an anti-kink means. This in turn is preferably realized in an end region of the line. Furthermore, a suitably varying cross-sectional geometry is also suitable as an anti-kink means. In the case of a sealing bush being formed, it is in particular the case that later, in the installed state, a passage opening through which the line is guided is sealed off. Instead of or in addition to the embodiments mentioned above, a multiplicity of further embodiments of the subsection is conceivable as a housing or base structure for a functional element, for example for a plug, an earphone, a sensor or a valve.

It is preferable for the overall cross-sectional geometry to be changed in the at least one subsection. The variation of the cross-sectional geometry thus has the effect that not only the cross-sectional area but specifically also the circumferential contour is changed. In this way, it is for example made possible for the cross-sectional geometry to be varied from circular to oval, polygonal etc. or vice versa in the at least one subsection. By a change in the cross-sectional geometry, it is advantageously possible for translation of the line, torsion or even both to be prevented during operation. For example, a triangular cross-sectional geometry permits translation but not torsion of the line.

It is expedient if a length is predefined, and, before or after the at least one subsection, the outer shell is produced with a uniform cross-sectional geometry over the predefined length. In one variant, it is also possible for the outer shell to be produced with a uniform cross-sectional geometry both before and after the at least one subsection. By these two variants, it is possible in particular to form a line which is firstly a cable with a particular length, specifically substantially the predefined length, with a functional element arranged along the length or at the end of the length. Here, the functional element, or at least the housing thereof, is advantageously a part of the outer shell of the cable, that is to say is manufactured in one piece therewith and has the associated advantages already mentioned above.

In a preferred refinement, as already indicated above, at least one subsection is formed at an end side in the line longitudinal direction and is formed as an end section. Here, the end section has for example an electrical functional element, for example a plug element, a switch or a sensor, which is then integrated in the outer shell. This yields a step-free, visually appealing integration of the (plug) end region of the functional element into the outer shell. Such integration furthermore ensures a particularly good sealing action.

In a preferred refinement, a multi-component molding process, in particular a so-called 2-component process, is used, in which it is thus the case that multiple, in particular two, different plastics are used for forming the outer shell. For this purpose, multiple, in particular two, (injection-) molding apparatuses are used via which the different plastics compounds are fed. The outer shell thus has different plastics in different regions, which plastics differ with regard to their characteristics, for example physical characteristics. In particular, it is the case here that regions with different hardness are formed. Specifically, it is for example the case that special functional elements or functional zones composed of a material which differs from the basic form, in particular a harder material, are formed in the regions with varying cross-sectional geometry which differs from the basic form.

It is preferable for multiple molding modules to be arranged in a module cage, whereby the process can be made modular in a particularly simple manner. Here, the multiple molding modules are in particular inserted into the module cage one behind the other along the longitudinal axis. It is expediently also the case that alignment elements are provided for the alignment and in particular locking of the molding modules. For this purpose, a number of guide rails or cables is suitably guided, parallel to the longitudinal axis, through the molding modules, in particular through each of the molding modules. To ensure an optimum holding action during the execution of the process, it is the case in a preferred refinement that the molding modules are pressed against one another in the longitudinal direction in the module cage. For this purpose, the module cage has, at the end side, a closure wall or some other counter bearing against which the stack of molding modules is pressed. At the other end, the module cage is then in particular open. To generate a particularly uniform pressing force, at said other end, a second counter bearing formed in particular in the manner of a closure plate in attached to the stack, wherein the closure plate in particular likewise has suitable leadthroughs for the alignment elements.

By means of this modular construction, it is possible for a wide variety of different line types to be produced inexpensively using one set of molding modules. For this purpose, it is merely the case that different molding modules are combined, or the sequence thereof is varied. In this way, an inexpensive, flexible process is made possible.

A preferred embodiment of the line contains in each case a multiplicity of periodically alternating first and second subsections, wherein the first subsections each have a predefined length and have a cross-sectional geometry which does not vary along the line longitudinal direction, and wherein the second subsections are formed as fastening points. The fastening points are for example formed as so-called fir-tree-shaped studs or as eyelets, lugs etc. In a suitable refinement, the line is a preferably band-like conductor, in particular a copper band, which is provided with an outer shell which, at periodically repeating intervals, has a number of fastening points which are preferably formed as fir-tree-shaped studs and which, owing to the process, are molded integrally on the outer shell. Alternatively, the line with the special fastening points is formed as a (circular-section) cable. By means of the specified process, such a line can be manufactured particularly easily, and furthermore exhibits high dimensional stability in particular at the potentially highly loaded fastening points.

In general, the line has, in particular, a line core which runs in the line longitudinal direction and along the longitudinal axis. In the stretched state, the line core thus runs in straight fashion through the entire line. In particular in those subsections whose cross-sectional geometry is rotationally symmetrical, the line core thus runs centrally on a central axis. By this particularly precise alignment or centering of the line core, the outer shell has a suitable and in particular uniform radial thickness in all sections of the line.

The line is expediently a visible connection cable for electrical appliances. The connection cable is in particular a media cable for the transmission of audio, video or data files. Furthermore, the connection cable may however, also be a connection cable for household appliances, in particular appliances in which the connection cable is permanently visible. By the electrical cable described here, a particularly high level of design appeal of the electrical line is achieved.

The object is furthermore achieved by means of a tool mold. Here, the advantages and refinements mentioned in conjunction with the process and the line also apply analogously to the tool mold.

The tool mold contains a molding module which has a mold cavity with variable cross-sectional geometry and which has a feed opening for the feed of a line core. By use of a tool mold of this type, it is possible to produce a line with a particularly advantageously aligned line core. The molding module is formed as a divisible extrusion nozzle and, in this case, is particularly suitable for the execution of the above-described injection extrusion process with an extrusion step and an end step.

Other features which are considered as characteristic for the invention are set forth in the appended claims.

Although the invention is illustrated and described herein as embodied in a method for producing an electrical line, a tool mould for such a method, and a line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
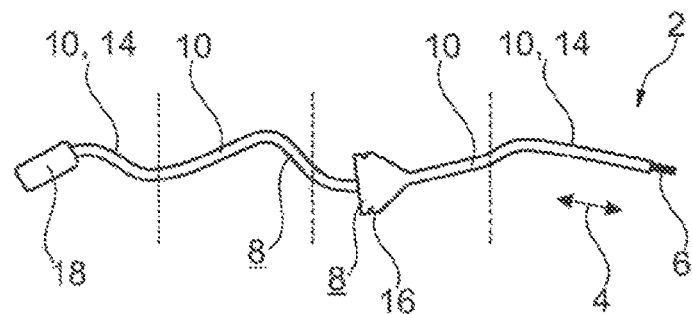
FIG. 1 is a diagrammatic, perspective view of an electrical line as per a first design variant according to the invention.
Figure 2:
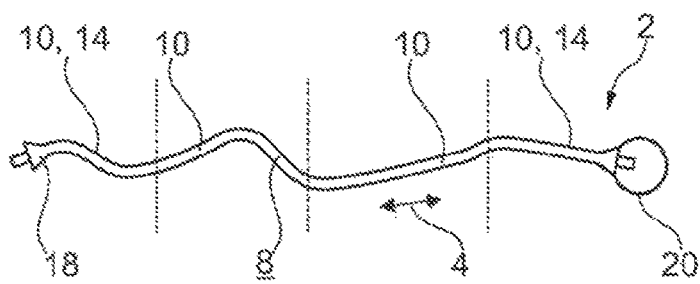
FIG. 2 is a perspective view of the electrical line as per a second design variant.

Referring now to the figures of the drawings in detail and first, particularly to FIGS. 1 and 2 thereof, there is shown electrical lines 2 which extend in each case in a line longitudinal direction 4 and contain a line core 6 which is surrounded by an outer shell 8. The outer shell 8 is in this case formed from individual shell sections 10 which directly adjoin one another. In the fully manufactured state, owing to the special molding process to be described below, the shell sections 10 are not individually distinguishable, that is to say the points at which the individual shell sections 10 adjoin one another are not recognizable.

The outer shell 8 is a protective or insulating shell which is generally formed from a hardenable plastics polymer compound. The line core 6 involves one or more electrical conductor wires 12 which are present for example in the form of bundled individual wires or else in the form of coaxial lines etc. The line core 6 may also have a complex construction composed of different line components. Here, it is also possible for optical transmission fibers and/or other components to be integrated into the line core 6. The line core 6 however preferably involves exclusively electrical conductor wires 12 which have in each case one electrical conductor surrounded by an insulator.

The electrical lines 2 are preferably flexible, that is to say non-dimensionally-stable lines, such as are used for example as connection cables for a wide variety of technical appliances, in particular in the field of entertainment electronics.

The electrical line 2 illustrated in FIG. 1 has two special subsections 14 in which the outer shell 8 has a changed cross-sectional geometry in relation to the other shell sections 10. Here, in a central position, there is formed a sealing bush 16, which is thus a direct part of the outer shell 8. Finally, in an end region on the left-hand side, a plug housing 18 is molded as a direct part of the outer shell 8. The sealing bush 16 extends in this case in a radial direction proceeding from a basic form of the outer shell 8. Here, it is commonly the case that the outer shell 8 widens to a radial end diameter which amounts to several times the normal diameter. In the exemplary embodiment, the sealing bush 16 contains an encircling annular groove. Furthermore, in the exemplary embodiment, it is provided that the sealing bush 16, at one end side thereof, extends approximately perpendicular to the line longitudinal direction 4 in the manner of a closure plate. The sealing bush 16 has for example a circular cross-sectional contour, or alternatively a rectangular cross-sectional contour.

In the same way, it is also provided in the case of the plug housing 18 that the latter optionally has a circular or else a rectangular cross-sectional contour which projects in a radial direction beyond the base cross section of the outer shell 8. In principle, however, substantially any desired cross-sectional contour can be realized. Furthermore, undercuts are also possible. Here, in the exemplary embodiment of FIG. 1, an abrupt change and thus cross-sectional step is provided at the start of the plug housing 18.

FIG. 2 shows, as an exemplary embodiment of the electrical line 2, an earphone cable with integrated in-ear earphone 20. The in-ear earphone 20 is in this case also directly jointly integrated into the outer shell 8, wherein, for this purpose, the outer shell widens conically in the end region toward the in-ear earphone 20. A conically widening end piece of the outer shell 8 is likewise formed at the opposite end, from which end piece a plug element 22 emerges. The continuous molding process will be discussed in more detail below on the basis of FIGS. 3A and 3B.

For the production of the electrical line 2, use is made of a modular tool mold 24 which has multiple molding modules 26 which directly follow one another in a line. For the feed of the line core, the tool mold 24 illustrated here contains a feed opening 27A via which, during the process, the line core 6 is guided into the tool mold 24 in successive or continuous fashion. Furthermore, the tool mold shown in FIGS. 3A and 3B also contains an exit opening 27B via which the line core 6 can be led out of the tool mold 24.

The individual molding modules 26 are formed in the manner of conventional tool molds and are for example divided in the center along a dividing plane. Each molding module 26 has at least one gate slot 28 which extends in a conveying direction 36 and which can be seen particularly clearly in the plan view shown in FIG. 3B. A plastics compound 30 which is present in the form of a melt is introduced via the respective gate slot 28. This is realized by an injection unit 32 which injects the compound 30 into the respective molding module 26 at a respective injection point 34. Here, the injection point 34 is guided along the gate slot 28 in continuous fashion.

During the molding process, the individual molding modules 26 are guided in a conveying direction 36 past the in particular static injection point 34. In the exemplary embodiment, the individual molding modules 26 are in a linear in-line arrangement. In an alternative preferred refinement, the individual molding modules 26 are arranged adjacent to one another in a circle, such that they are thus guided repeatedly along a circular path past the injection point 34. In a combination, it is also possible for a linear endless manufacturing arrangement to be realized by virtue of multiple molding modules 26 being arranged in linear fashion and the in each case final molding module 26 in the row being placed in front of the first molding module 26 of the row by a suitable mechanism in repeating fashion. This process is particularly suitable for the endless manufacture of initially straight lines 2.

Within the individual molding modules 26, mold cavities 38 are defined by the free internal hollow space, which mold cavities thus specify and define the shape of the outer shell 8 to be formed. Here, by the modular construction, it is made possible to provide different mold cavities 38 in order to form different cross-sectional geometries for the individual shell sections 10.

Figure 3A:
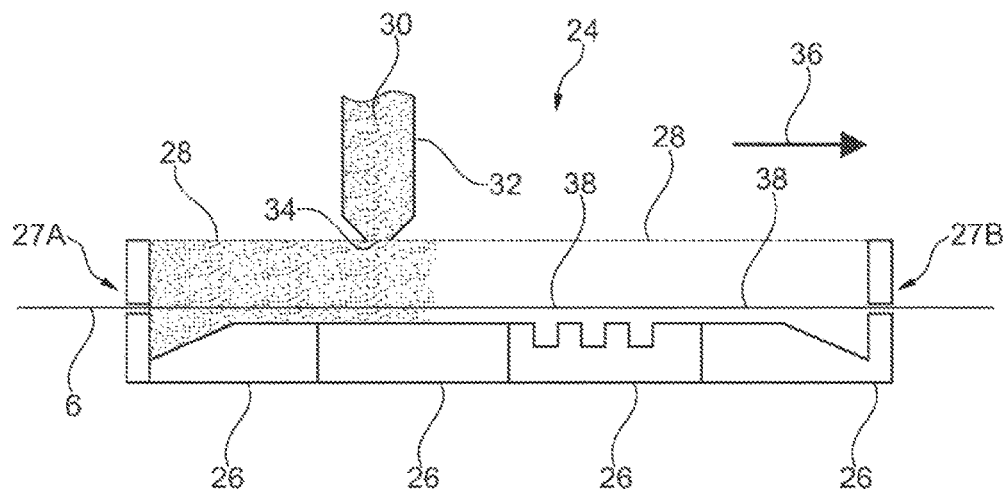
FIG. 3A is a highly simplified schematic illustration of a first continuous molding process in a first view.
Figure 3B:
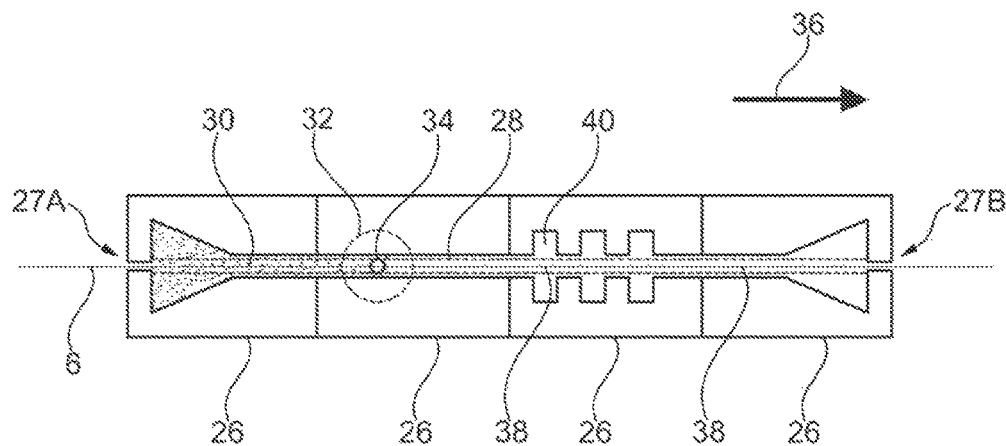
FIG. 3B is a schematic illustration showing the first molding process as per FIG. 3A in a second view.

In the highly simplified example of FIGS. 3A and 3B, the two outer molding modules 26 each have molding cavities 38 with a conically widening shape. The left-hand one of the two central molding modules 26 has a molding cavity 38 with a normal, circular cross-sectional geometry without a radial widening. Finally, the molding module 26 that adjoins the aforementioned molding module to the right has a rib structure for forming radially outwardly projecting ribs 40.

In the simplified illustration as per FIGS. 3A and 3B, the line core 6 which is introduced into the modular tool mold 24 before the feed of the compound 30 is not illustrated. The exemplary embodiment involves a tool mold which is closed off on both sides, such that the final cable that is produced is thus already produced with a defined length. As an alternative to this, in particular in the case of a circular arrangement of the individual molding modules 26, continuous production of an endless line is also made possible, in the case of which endless line the special shell sections 10 are formed repeatedly in periodically repeating length sections. This is advantageous in particular for the production of standard cables which are for example retroactively provided in a desired manufacturing length by being cut to size.

During the production process, the gate slots 28 of the individual molding modules 26 are guided in successive fashion past the injection point 34, and the compound 30 is introduced by the respective gate slot 28 until the respective molding module 26 has been filled. Subsequently, the next molding module 26 is filled, such that continuous filling of the internal hollow space, formed by the individual molding modules 26, of the modular tool mold 24 is thus realized. Here, the compound 30 hardens already in the molding modules 26 that are filled first, such that the individual sections of the line 2 can be removed in successive fashion after opening of the respective molding modules 26. A strand-like entity is thus removed in continuous fashion from the modular tool mold 24.

Figure 3C:
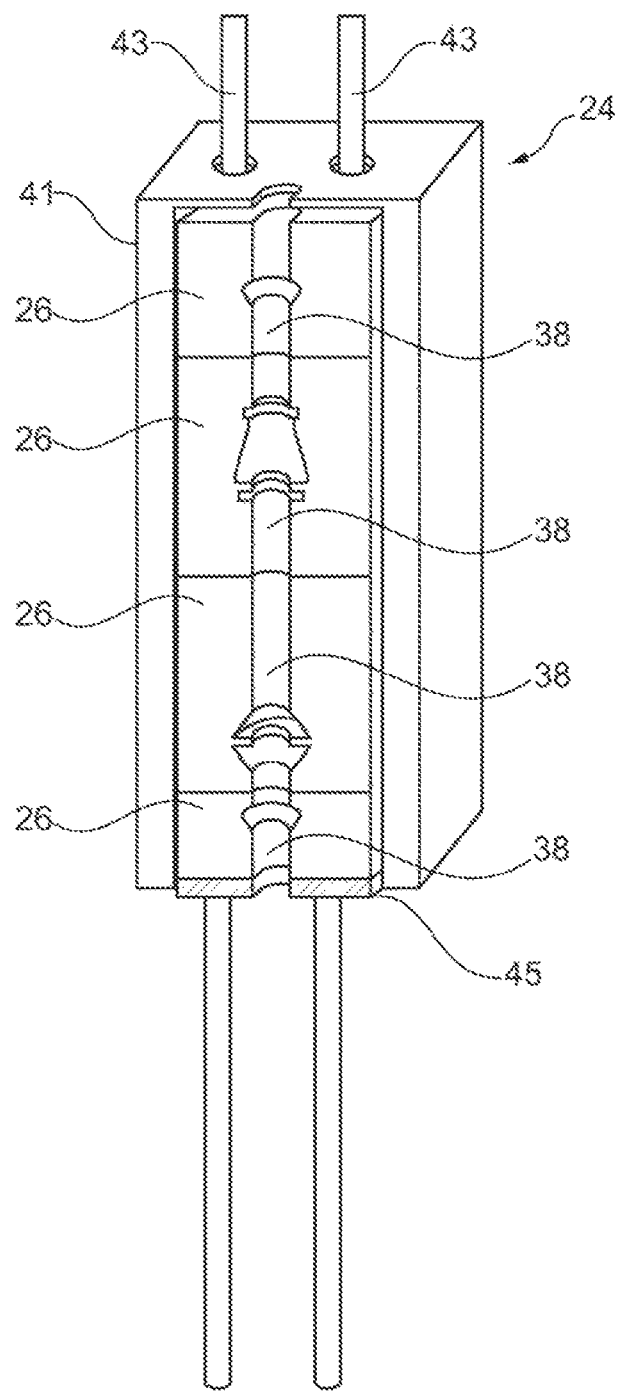
FIG. 3C is a perspective view of a variant of the molding process as per FIG. 3A.
Figure 3D:
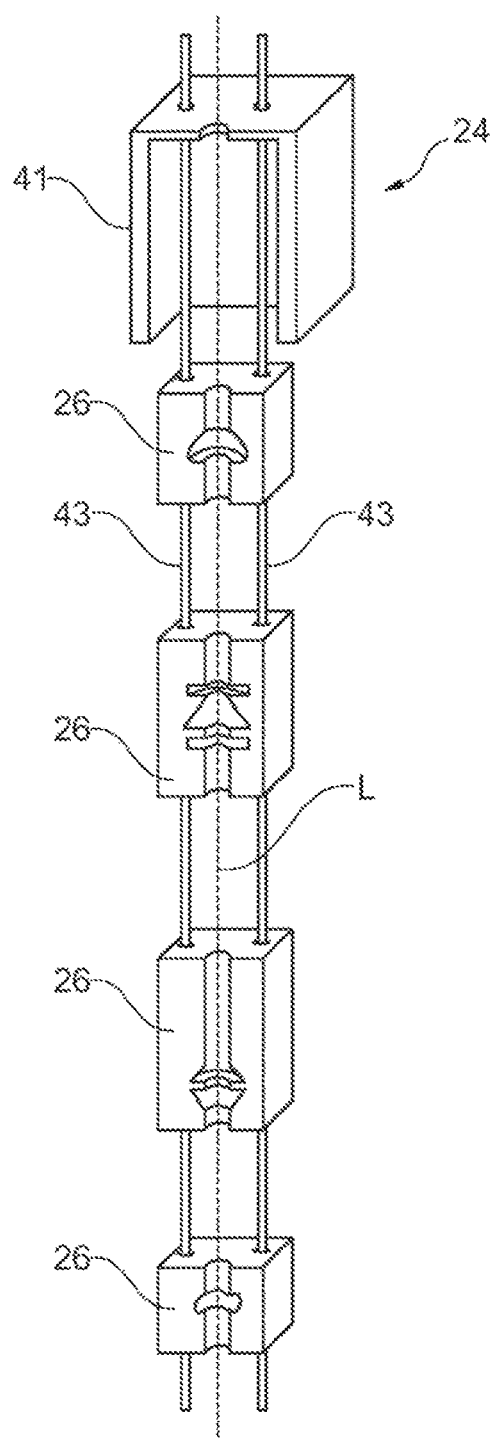
FIG. 3D is an exploded, perspective view of the arrangement of FIG. 3C.

For further illustration of a suitable refinement of the process, FIGS. 3C and 3D show a variant of the arrangement of FIGS. 3A and 3B in a perspective illustration. Here, FIG. 3D shows the arrangement from FIG. 3A in an exploded illustration. It is possible to clearly see the multiple molding modules 26, which in this case are arranged in a module cage 41 and one behind the other with respect to the longitudinal axis L. Furthermore, for the alignment of the molding modules 26, a number of alignment elements 43 is guided in the longitudinal direction L through the module cage 41. The molding modules 26 then each have corresponding lead-throughs through which the alignment elements 43 are guided. At the lower end of the stack of molding modules 26 there is arranged a closure plate 45 on which a suitable contact pressure is exerted in order to position the molding elements 26 firmly against one another and eliminate or reduce gaps between the molding elements 26.

Figure 4:
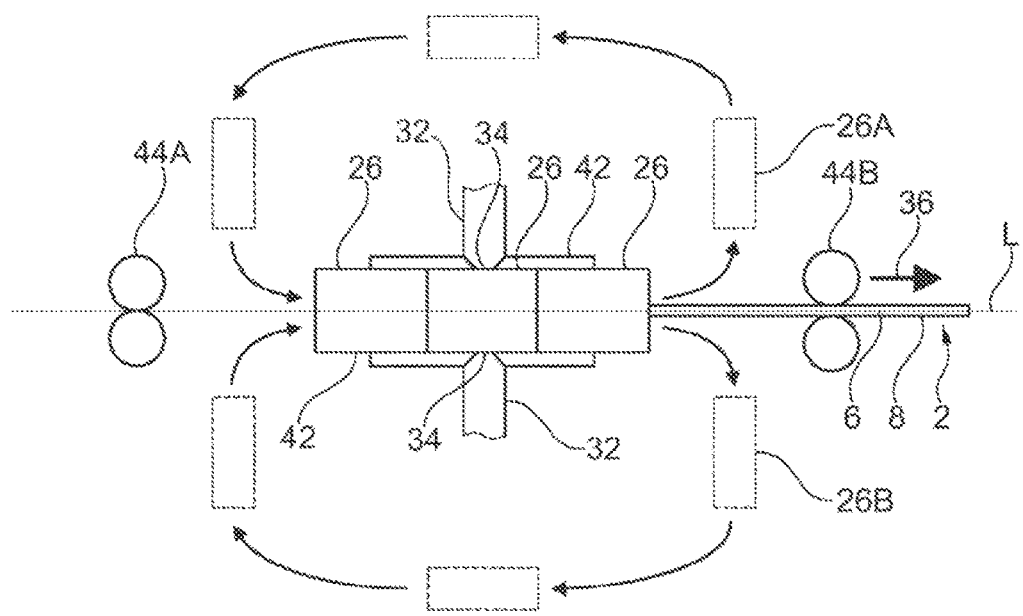
FIG. 4 is a schematic illustration showing a first refinement of the first molding process.

For further illustration, FIG. 4 schematically illustrates a first exemplary embodiment of the above-described process. The tool mold 24 has in this case multiple molding modules 26 which are divisible in each case into two halves 26A, 26B. In the exemplary embodiment shown here, three molding modules 26 are arranged in a row, that is to say linearly, wherein two injection points 34 are positioned at the central molding module 26. To prevent the compound 30 from spilling out of that region of the gate slots 28 which is not covered by the injection points 34, the molding module is additionally enclosed by in this case two sealing plates 42.

A line core 6 is fed in continuous fashion to the tool mold 24, with the plastics compound 30 being applied to the line core. Both the line core 6 and the molding elements are in this case moved in the conveying direction 36 and relative to the injection points 34. Here, the molding elements 26 are repeatedly divided into the respective halves 26A, 26B and, by a mechanism not illustrated in any more detail here, conveyed back in order to be assembled again and guided past the injection points 34 again.

During the production process, the line core 6 is fed to the tool mold 24, and is removed from the tool mold 24, that is to say conveyed out of the tool mold, with the applied outer shell 8, by two guide elements 44A, 44B which in this case are in the form of conveying elements. Here, the line core 6 is also held under tension by the guide elements 44A, 44B in order to prevent slippage of the line core 6 relative to a predefined longitudinal axis L during the injection of the compound 30 and in order to compensate a possible expansion of the line core 6, again in order to avoid slippage. To realize a tensile load, it is the case in the embodiment shown here that one guide element 44A is in the form of a braking crawler and the other guide element 44B is in the form of a thrust crawler.

Figure 5:
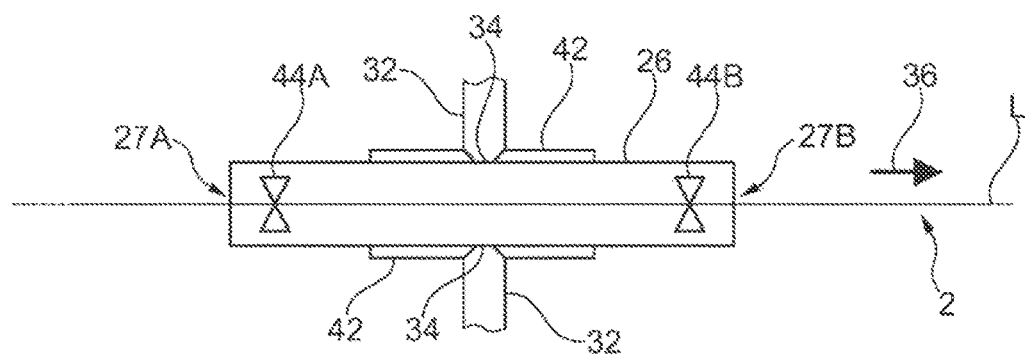
FIG. 5 is a schematic illustration showing a second refinement of the first molding process.

FIG. 5 schematically illustrates a second exemplary embodiment for the production of a line 2. By contrast to the process described above, the line 6 is held on the tool mold 24 by two guide elements 44A, 44B in the form of holding jaws, and the line 6 is guided together with the tool mold 24 past the injection points 34. In particular, the line 2 is in this case manufactured in its entirety. After the injection of the compound 30 and the hardening thereof, the line 2 is removed from the tool mold 24, and the tool mold is returned and a new section of the line core 6 is fed in. The process is quasi-continuous, by contrast to the purely continuous process described in FIG. 4.

Figure 6:
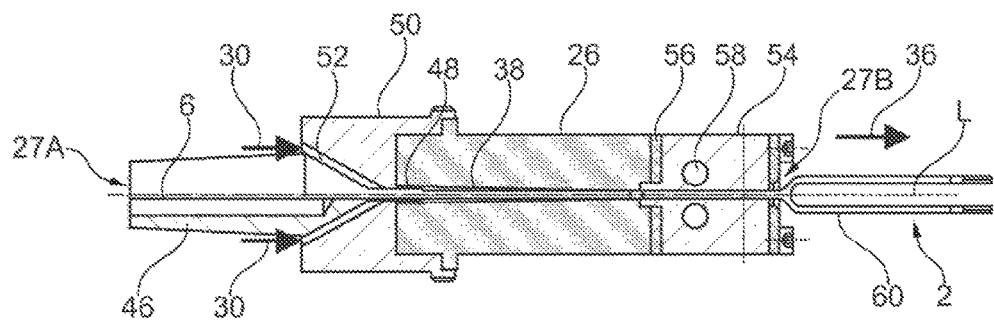
FIG. 6 is a schematic illustration showing an alternative second molding process.

FIG. 6 illustrates an alternative refinement of the molding process, which has a continuous process part and an injection-molding-like process part, specifically an extrusion step and an end step. For this purpose, the arrangement shown in FIG. 6 comprises first a tool mold 24 which has a molding module 26 which, in the extrusion step, serves as a mouth piece and which, in the end step, serves as a mold for an in particular end-side subsection 14 of the line 2.

For the production of the line 2, a line core 6 and a plastics compound 30 are fed to the molding module 26 via an extrusion mandrel 46. Here, the line core 6 is fed to the molding element 26 in centered fashion, that is to say on a longitudinal axis L, which in the exemplary embodiment shown here is simultaneously a central axis of the finished line 2, via a projection 48 of the extrusion mandrel 46.

The plastics compound 30 is fed to the molding module 26 over the outer wall of the extrusion mandrel 46, which in the embodiment shown here is inserted into a material distributor 50 and, together with the latter, forms a conical-shell-shaped, generally annular hollow space 52. Via the hollow space 52, the compound 30, which is introduced into the material distributor 50 by an injection unit 32 (not illustrated here), is applied to the line core 6 in particularly uniform fashion in a radial direction with respect to the longitudinal axis L. Here, the molding module 26 is in particular suitably temperature-controlled in order to keep the plastics compound 30 in a flowable state.

The line core 6 and the compound 30 are then conveyed through the molding module 26 in the conveying direction 36 into a cooling module 54. The cooling module is thermally insulated with respect to the molding module 26 by an insulator 56 and furthermore has a number of coolant bores 58 through which a cooling liquid is pumped. In the cooling module 54, the compound 30 is cooled and hardened, such that, at the end of the cooling module, the line core 6 is equipped with a finished outer shell 8 for forming a shell section 10.

It is also shown in FIG. 6 that the line 2 may also be molded onto an already manufactured semifinished part 60. The semifinished part 60 illustrated here contains a bifurcation for splitting into two separate partial strands, as is common for example in the case of earphones. The semifinished part 60 is then, at the start of the process, suitably placed into the tool mold 24 such that the line 2 can thereafter be molded on directly and in any desired length.

To complete the line 2, in the end step of the process shown in FIG. 6, the conveyance of the line core 6 is stopped, and the compound 30 that remains in the molding module 26 is hardened. For this purpose, the molding module 26 is in particular cooled. Through corresponding design of the molding cavity 38 of the molding module 26, that partial section 14 which is now arranged at the end side on the line 2 can be designed in virtually any desired manner. In the exemplary embodiment shown here, the outer shell 8 is, on the subsection 14, formed so as to widen counter to the conveying direction 36.

Figure 7:
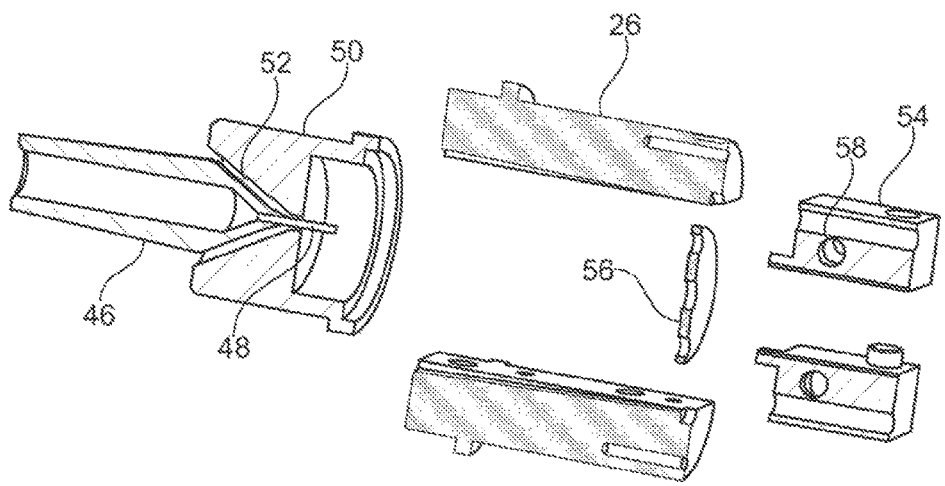
FIG. 7 is a perspective view showing a tool mold for the second molding process as per FIG. 6.

FIG. 7 shows the tool mold 24 from FIG. 6 in an exploded illustration of a sectional view. It is possible to clearly see the extrusion mandrel 46, the material distributor 50, the molding module 26, the insulator 56 and the cooling module 54. The molding module 26 and the cooling module 54 are in this case in particular divisible in order to facilitate a removal of the line 2 after the end step.

Figure 8:
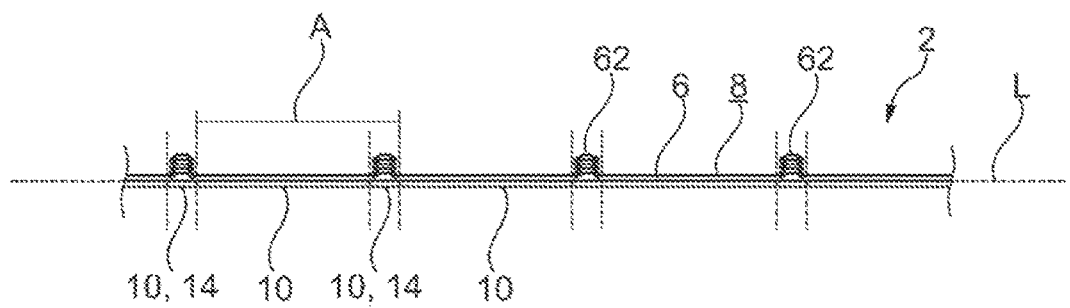
FIG. 8 is side view of an electrical line as per a third design variant.

FIG. 8 schematically shows a third exemplary embodiment of a line 2, which can be manufactured in a simple manner in particular by means of a molding process described in conjunction with FIGS. 4 and 5. The line 2 is configured as an endless line, that is to say can be manufactured in a predefined length which is adjustable in accordance with the usage requirements during the production process. The line 2 contains a line core 6 which in this case is configured as a band to which a flat-band-like outer shell 8 has been applied. Along the line 2, a number of subsections 14 formed as fastening points 62 are arranged in repeating fashion at predefined intervals A, which subsections are in this case formed as fir-tree-like studs. The fastening points 62 have in this case been manufactured during the formation of the outer shell 8, that is to say are formed in one piece with said outer shell. Then, between two fastening points 62, there extends in each case one shell section 10 which has a cross-sectional geometry which does not vary along the longitudinal axis L.

The line 2 illustrated in FIG. 8 can however also be produced by means of the process described in FIG. 6. For this purpose, the molding module 26 has a mold cavity 36 which is suitable for forming a fastening point 62. Then, in the extrusion step, a shell section 10 is firstly manufactured, to which a fastening point 62 as subsection 14 is then attached in a subsequent end step. After the hardening, the molding module 26 is opened, the line 2 is removed, and the line is used as a semi finished part 60 for the integral molding of a further shell section 10 with a terminating fastening point 62. Here, there is advantageously no need for the line core 6 to be severed. As a result, it is possible to produce a line 2 of any desired length with multiple fastening points 62 at predefined intervals A, with in each case one shell section 10 arranged between the fastening points 62.

The following is a summary list of reference numerals and the corresponding structure used in the above description of the invention:

2 Electrical line
4 Line longitudinal direction
6 Line core
8 Outer shell
10 Shell section
12 Conductor wires
14 Subsection
16 Sealing bush
18 Plug housing
20 In-ear earphone
22 Plug element
24 Modular tool mold
26 Molding module
26A, 26B Half
27A Feed opening
27B Exit opening
28 Gate slot
30 Plastics compound
32 Injection unit
34 Injection point
36 Conveying direction
38 Molding cavity
40 Ribs
41 Module cage
42 Sealing plate
43 Alignment element
44A, 44B Guide element
45 Closure plate
46 Extrusion mandrel
48 Projection (of the extrusion mandrel)

50 Material distributor
52 Hollow chamber
54 Cooling module
56 Insulator
58 Coolant bores
60 Semifinished part
62 Fastening points
L Longitudinal axis
A Interval

The invention claimed is:

1. A process for producing a line extending in a line longitudinal direction and having a line core and an outer shell surrounding the line core, which comprises the steps of:
    forming the outer shell from individual shell sections directly adjoining one another, the individual shell sections of the outer shell being formed, in a continuous molding process by a tool mold, in successive fashion by virtue of the line core being surrounded with a solidifiable plastics compound, said tool mold formed of at least two parts divided along a dividing plane, wherein, in at least one subsection, the outer shell is produced with a varying cross-sectional geometry varying in the line longitudinal direction;
    forming the outer shell with the subsection having the varying cross-sectional geometry by introducing the solidifiable plastics compound into the tool mold, the tool mold having at least one molding module having a molding cavity with a cross-sectional geometry varying in the line longitudinal direction to form the subsection with the varying cross-sectional geometry;
    producing the outer shell by means of the tool mold in a modified extrusion process, wherein the molding module serves in an extrusion step as an extrusion nozzle and second in a subsequent end step the molding module serves as a casting mold;
    during the extrusion step, guiding the line core continuously through the molding module and a further subsection of the outer shell with an uniform cross-sectional geometry is extruded onto the line core; and
    during the subsequent end step, a feeding of the line core is interrupted and the line core remains within the molding module and the solidifiable plastics compound introduced therein solidifies in the molding module.

2. The process according to claim 1, which further comprises:
    forming the molding module from multiple parts that are divisible from each other; and
    separating the molding module after a hardening process, and the line core provided with the outer shell is removed from the molding module.

3. The process according to claim 1, wherein the molding module is temperature-controlled, and, in the extrusion step, the solidifiable plastics compound is kept in a flowable state, and in the end step, the molding module is actively cooled.

4. The process according to claim 1, which further comprises:
    positioning upstream of the molding module, an extrusion mandrel, through which in turn the line core is guided, and wherein the extrusion mandrel is received in a material distributor so as to form an annular hollow chamber via which the solidifiable plastics compound is fed.

5. The process according to claim 1, which further comprises positioning a cooling module downstream of the molding module, by the cooling module cooling of the solidifiable plastics compound applied to the line core is realized.

6. The process according to claim 5, wherein the cooling module is thermally insulated with respect to the molding module, and the cooling module and the molding module are temperature-controlled differently at least during the extrusion step.

* * * * *